United States Patent [19]
Sheaffer

[11] Patent Number: 6,068,773
[45] Date of Patent: May 30, 2000

[54] SINGLE-CELL WASTEWATER RECLAMATION AND REUSE SYSTEM

[75] Inventor: John R. Sheaffer, Wheaton, Ill.

[73] Assignee: Sheaffer International Ltd., Naperville, Ill.

[21] Appl. No.: 09/071,455

[22] Filed: May 1, 1998

[51] Int. Cl.$^7$ .................................. C02F 3/30; C02F 7/00
[52] U.S. Cl. .......................... 210/605; 210/739; 210/747; 210/758; 210/149; 210/170; 210/177; 210/205; 210/232; 210/532.2
[58] Field of Search ..................................... 210/602, 605, 210/612, 614, 620, 630, 631, 739, 747, 758, 766, 96.1, 141–143, 149, 170, 171, 173, 177, 187, 205, 220, 232, 251, 532.2

[56] References Cited

U.S. PATENT DOCUMENTS

| | | | |
|---|---|---|---|
| 4,169,050 | 9/1979 | Serfling et al. | 210/602 |
| 4,267,038 | 5/1981 | Thompson | 210/170 |
| 4,664,812 | 5/1987 | Klein | 210/232 |
| 4,944,872 | 7/1990 | Kantor | 210/170 |
| 4,997,508 | 3/1991 | Vandervelde et al. | 210/605 |
| 5,087,353 | 2/1992 | Todd et al. | 210/170 |
| 5,322,629 | 6/1994 | Stewart | 210/170 |
| 5,389,257 | 2/1995 | Todd et al. | 210/747 |
| 5,707,531 | 1/1998 | Jowett et al. | 210/170 |
| 5,735,934 | 4/1998 | Spears | 210/758 |

OTHER PUBLICATIONS

Sheaffer & Roland, Inc. Blackford County Jail, Indiana, *Wastewater Reclamation and Reuse System Engineering Report*, prepared for Future Water Indiana, LLC, Jul. 5, 1994.

Phillips, Jim Methane–Powered Farm Has Kilowatts to Spare, *Farm Journal* pp. 1–2, Feb. 1980.

Diamond, David Cows Eliminate an Energy Problem, *Philadelphia Enquirer* Jan. 31, 1980.

News From: Mason Dixon Farms, Sheaffer & Roland, Inc., Stewart & Stevenson Services, Inc., News Conference at Mason Dixon Farms, Inc. Jan. 30, 1980.

Sheaffer, J.R. and Sezonov, L, .*The Illinois Reuse System* pp. 1–9.

*Primary Examiner*—Thomas G. Wyse
*Attorney, Agent, or Firm*—Foley & Lardner; Jefferson Perkins

[57] ABSTRACT

A single-cell wastewater treatment and reuse system designed for wastewater flows of less than 1,500 gpd includes a wastewater treatment cell having a volume in the range of about 14 to about 42 times average daily discharge from a wastewater source, such as a residence, and an overlying reclaimed water storage volume which, for one temperate location, is sized to store about 120 days of reclaimed water. An end of an air conduit disposed in the treatment cell at an elevation higher than the cell bottom but substantially lower than a top margin of the treatment cell provides 2,500 cubic feet per pound of introduced biomass. A pump is operated to selectively withdraw reclaimed water for a beneficial use such as plant irrigation.

44 Claims, 3 Drawing Sheets

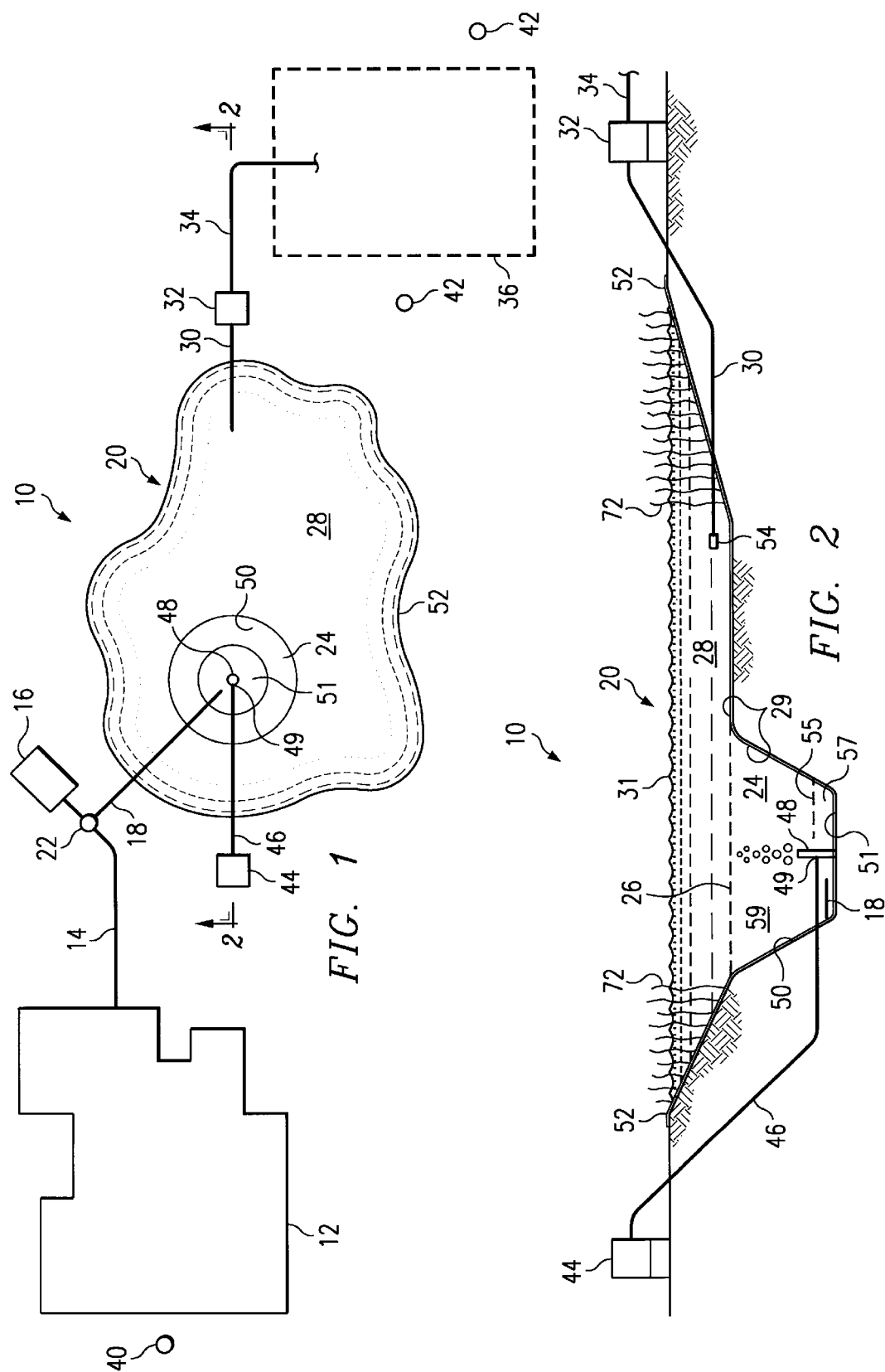

SINGLE-CELL WASTEWATER RECLAMATION AND REUSE SYSTEM

TECHNICAL FIELD OF THE INVENTION

The present invention relates in general to wastewater treatment systems, and more particularly to a contained wastewater reclamation system for relatively small wastewater flows in which the reclaimed water is available for beneficial reuse.

BACKGROUND OF THE INVENTION

One of the great advances of the nineteenth and twentieth centuries was the realization that improper treatment of human and other animal waste leads to pollution of otherwise potable water supplies and to disease. Sewage treatment systems sprang from this realization. There are two kinds in common residential, business and light industrial use.

The first kind is the municipal sewage system, in which all of the residences, businesses and institutions in a municipality are connected through a network of sanitary sewers to a central sewage treatment plant. After treatment, the wastewater is discharged into a river or other body of water. Often, this water has high nutrient levels, leading to undesirable eutrophic activity in the body of water into which the effluent is discharged, producing algal blooms, decreased oxygen concentration levels, fish kills and undesirable odors. Another byproduct of the typical municipal sewage system is sludge, which must be hauled away for incineration, burial in a landfill or dumping at sea—and which, in the course of being disturbed, emits a highly objectionable odor.

The second kind is the septic system, typically installed for single residences in unincorporated locations where connection to a sanitary sewer is unavailable. Even properly designed septic systems still have some objectionable wastewater discharge, and since septic systems are usually installed in tandem with wells for drinking water, care must be taken that a septic system discharge does not contaminate the potable well water of the same property or of adjacent properties. The septic system wastewater is not put to any beneficial use, and sludge accumulates in the septic tank of the system, requiring periodic removal. Septic systems, therefore, have the same environmental problems relating to sludge handling that the municipal sanitary sewer systems do.

Other wastewater treatment systems have been devised for large-scale, typically industrial use. Currently the smallest wastewater reclamation and reuse system which is permitted by the environmental protection agency in one state (Illinois) is 3,100 gallons per day and employs multiple cells. In a modular reclamation and reuse system previously developed by the inventor, wastewater is sent to a first treatment pond or cell, where it is aerated by the injection of air at the 10 bottom of the pond. After residing in the pond for a number of days sufficient to cause anaerobic degradation of biomass and aerobic disinfection of the water, the treated wastewater is sent to a second, holding pond. The wastewater is eventually released for beneficial use, such as crop irrigation or the watering of golf courses. This two-cell system occupies of great deal of land area.

To date, however, no system of this type has been used as a replacement for a septic system or other small-scale wastewater treatment system. In fact, to the inventor's knowledge, none of the public health codes of the 50 states contemplates such a use. Because of continuing problems of sludge disposal, incomplete wastewater treatment and inefficient water use, a need persists for improved wastewater treatment systems in which better use can be put to the treated wastewater.

SUMMARY OF THE INVENTION

According to one aspect of the present invention, a method and apparatus are provided for treating wastewater from a source having a wastewater effluent volume of no more than 1,500 gallons per day. Preferably a wastewater macerator or commutator receives the wastewater and macerates any biomass which may be in it. The wastewater is introduced, as by a first conduit and a pump, into a treatment cell forming a portion of a pond, where the pond also includes a storage volume adjoining the treatment cell.

The treatment cell volume is sized according to the average calculated wastewater volume w which is discharged in a day by a source of wastewater for which the treatment and reuse system is provided. The minimum size of the treatment cell is in the range of about 14w to about 42w. The size of the storage volume depends on the maximum number of consecutive days during which discharge of the treated wastewater cannot be made; for temperate climates, this is typically w, multiplied by a number of days (usually having freezing weather) during which discharge cannot be made, minus the treatment volume. This storage volume size may range from less than 1w to 150w, and in one embodiment is about 120w. At least a portion of the storage volume is located above the treatment cell.

An end of an air conduit is sited in the treatment cell to be spaced from the bottom and to be spaced substantially below the top of the treatment cell. The air conduit introduces air into the treatment cell at a rate which is at least 1500 and more preferably is 2500 cubic feet STP for each pound of biomass (measured as $BOD_5$) introduced into the treatment cell by the wastewater. An aerator preferably is placed over the air conduit end to better distribute the injected air.

A second conduit is provided to transport reclaimed water from the storage volume to an area for beneficial use of the reclaimed water, such as an irrigated area. Preferably, a pump is selectively operated to discharge the reclaimed water, and may be automatically controlled to operate as a function of one or several predetermined variables, such as rainfall, wind velocity, air temperature, minimum and maximum irrigation to be performed in a predetermined period, and irrigation already performed during the current period.

According to another aspect of the invention, the air conduit end is positioned to be one to two feet from the bottom of the treatment cell, and at least eight to ten feet from the top of the treatment cell, which in turn is at the same elevation as the bottom of the storage volume. The wastewater is introduced into an anaerobic zone located below the air conduit. Organic solids are decomposed in this anaerobic zone. The rest of the treatment cell is occupied by a heavily aerated aerobic zone in which anaerobic pathogens are killed by oxygen. Typically, the storage volume will occupy an area which is considerably larger than, and which in plan view overlays, the area of the treatment cell.

For proper operation, the average diameter of the treatment cell, in the preferred single-cell configuration, should be no greater than thirty feet as measured at its bottom, and preferably is about fifteen feet across. The shape of the treatment cell will vary according to construction methodology.

The present invention is ideal for use with single residences, small offices and commercial facilities with flows of less than 1,500 gallons per day and located on appropriate sites.

A principal technical advantage of the invention is that sludge removal requirements are sharply reduced. There is no organic sludge created by the invention. Removal of inorganic sludge—consisting entirely of inorganic and other nonbiodegradable matter—is estimated to be no more than three percent of the amount of sludge accumulated by a conventional septic system servicing the same daily wastewater discharge flow. The inorganic solids accumulating at the bottom of the treatment cell will need to be removed once every twenty to thirty years. Processing one million gallons of wastewater results in approximately 60 pounds of inorganic solids. In contrast, conventional treatment of one million gallons of wastewater produces about 2,000 pounds of sludge, which must be burned, barged out to sea, chemically processed or trucked to a landfill—in the last instance creating the danger of leaching into the groundwater.

Another technical advantage is that the reclaimed water, and the nutrients it carries, may be put to a further, beneficial use. One such use is the irrigation and fertilization of plants. Another such use, not inconsistent with the first, is the provision of a fire fighting water supply in the instance that the residence or other wastewater source is remote from municipal fire hydrants or other water sources.

BRIEF DESCRIPTION OF THE DRAWINGS

Further aspects of the invention and their advantages may be discerned by referring to the drawings, in which like characters identify like parts, and in which:

FIG. 1 is a plan view of a site using a wastewater treatment and reuse system according to the invention;

FIG. 2 is a cross-sectional view of the wastewater treatment and storage pond shown in FIG. 1, the section being taken substantially along line 2—2 of FIG. 1;

DETAILED DESCRIPTION OF THE INVENTION

Figure 3:
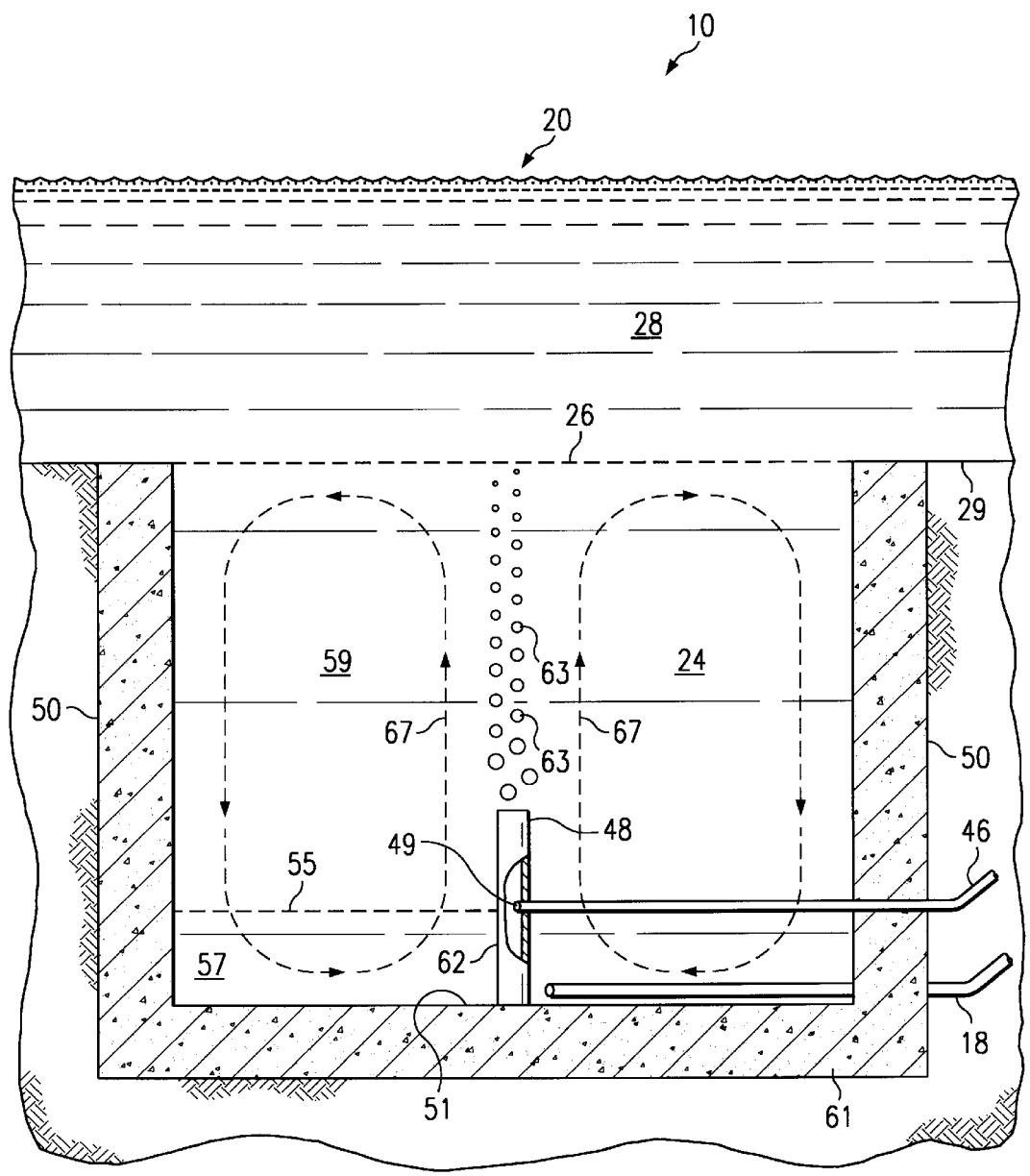
FIG. 3 is a sectional view of a further embodiment of the invention, and illustrating the wastewater treatment process.

A typical installation of the wastewater treatment and reuse system is indicated generally at 10 in FIGS. 1 and 2. A source 12 of wastewater, such as the illustrated residence, discharges its wastewater and entrained biomass through a conventional sanitary sewer 14. In one common circumstance, the system according to the invention will be used to replace an existing septic system, and in this instance the same sanitary sewer 14 can be used; of course, the system 10 may also be installed for new construction.

The biomass is quantified in the art as $BOD_5$—short for "biochemical oxygen demands." The amount of biomass measured by the $BOD_5$ method is determined by taking a quantity of the biomass, subjecting it to oxygen for five days, measuring the amount of oxygen which is consumed by the biomass during that time, and correlating the measured oxygen consumption to a mass quantity for the biomass.

A conduit 18 is tapped into the sanitary sewer 14 to complete a sewage discharge path to a combined wastewater treatment and storage pond 20. Somewhere along the course of sewer 14 and conduit 18 is installed a macerating or grinding pump 22 (here shown conveniently installed adjacent the septic tank 16), which grinds encountered biomass and pumps the discharge into a system pond indicated generally at 20.

The pond 20 contains two volumes critical to the operation of the invention: a wastewater treatment cell 24, disposed as is shown in a deep location and below a predetermined elevation 26, and a storage volume 28, adjoining (and preferably completely overlying) the treatment cell 24 and, at least in the vicinity of treatment cell 24, being above the predetermined elevation 26. The entirety of pond 20 may be lined with a fluid-impervious material 29 to prevent seepage. While the illustrated layer 29 is a 40 mil PVC membrane layer, other fluid barriers may be used, such as other plastic thin membranes, layers of various natural or amended clays, concrete, etc. A top elevation 31 of storage volume 28 is selected according to the desired size of volume 28; the top level should be at least two feet above level 26. The actual water level will vary according to how much water is injected or withdrawn.

A reclaimed water discharge pipe 30 communicates the storage volume 28, preferably but not necessarily at a location remote from the treatment cell 24, to a location for the beneficial use of the reclaimed water. In the illustrated embodiment, pipe 30 terminates in an irrigation pump 32, which is selectively operated to send reclaimed water through an irrigation pipe 34. Irrigation pipe 34 is in turn connected to an irrigation system located within an irrigated area 36, shown in FIG. 1 to be bordered in dashed line. The existing well 40 of the residence 12 is located remotely from the pond 20, as it would be from the septic system; preferably there is a set-off of at least 75 feet between well 40 and pond 20. While they are not sources of contamination if operated properly, preferably pond 20 and the irrigation area 36 are set off from potable wells of adjacent property owners by at least 200 feet. It is further preferred that monitoring wells 42 be installed at convenient and spaced-apart locations up gradient from irrigation area 36 and down gradient from irrigation area 36 to monitor groundwater quality.

Having given an overview of the system according to the invention, further details of it will be described. Continuing to refer to FIGS. 1 and 2, an aeration blower 44 is provided to blow the air through an aeration pipe 46 to an aerator 48. Inherently during its operation, blower 44 compresses intake air and as it does so, it heats the intake air. This contributes to an elevation in pond temperature. An end 49 of the aeration pipe 46 is placed from one to two feet above the bottom 51 of the treatment cell 24, and at least eight to ten feet below elevation 26, which is the demarcation between cell 24 and storage volume 28. An aerator 48 is situated over pipe end 49 so as to distribute injected air into a helical pattern. Pipe end 49 and aerator 48 preferably are sited at a central location in cell 24. The aeration blower 44 is sized and operated to provide a volume of air which is at least 1500 cubic feet as measured at standard temperature and pressure (STP), and preferably at least 2500 cubic feet of air, to the treatment cell 24 for every pound of $BOD_5$ in the wastewater to be converted.

In the embodiment illustrated in FIGS. 1–3, aeration blower 44 and aeration pipe 46 are sized to release air into the treatment volume 24 at a rate of about 10 cubic feet per minute. The blower 44 does not have to be operated continuously; it should be operated to aerate the $BOD_5$ by a sufficient amount. In the illustrated, single-residence embodiment, it is contemplated that blower 44 will operate on a six hour/eighteen hour on-off duty cycle, with the hours of operation chosen to create the least disturbance to the residents.

The treatment cell 24 is sized to be in the range of about fourteen to about forty-two times an average daily effluent volume w from the wastewater source 12, to take into account a treatment cycle time of 14 to 42 days. Preferably, the size of cell 24 is about 36w. Cell 24 includes an anaerobic zone 57 located between the elevation 55 and the cell bottom 51, in which dissolved and suspended biomass constituents decompose, and an aerobic zone 59, in which the aerated oxygen kills pathogens such as fecal coliform bacteria. Above elevation 55, the static tube aerator end 49 is aerating the cell 24 through upwardly rising air bubbles.

In the illustrated embodiment, residence 12 is expected to discharge about 350 gallons of wastewater per day. This estimate is used rather than an alternative measurement of 200 gallons per bedroom in residence 12 because the treatment cycle is long, and a large amount of storage is available for periods during which discharges for beneficial use of the treated wastewater are interrupted. For a discharge volume w of 350 gpd, the volume of cell 24 should be at least 4,900 to 14,700 gallons, and in the illustrated embodiment is about 12,600 gallons.

As illustrated in FIG. 2, treatment cell 24 may be formed as a substantially frustoconical space which is about 14.5 feet deep from the pond surface as it exists (near its planned capacity), about 12 to 17 feet in diameter, and preferably about 15 feet in diameter at bottom 51, and having sidewalls 50 with a minimum slope of about 0.5:1 (run:rise). The sidewalls 50 form a shoulder with the general bottom of storage volume 28.

For proper operation, the difference between the depth of cell 24 and the more general depth 26 of storage volume 28 should be at least nine to twelve feet, and preferably is about 11½ feet, although it could be much greater. For a single, four-bedroom residence application, the minimum liquid capacity of the treatment cell 24 should be at least 2,000 gallons, and more preferably at least 2,800 gallons. The outlet of wastewater introduction pipe 18 is positioned deep within the treatment cell 24 near, such as six inches from, the bottom 51 of cell 24, and below aerator 48. For flows similar to those generated in the illustrated embodiment, pipe 18 should have an inner diameter of at least two inches.

Treatment cell 24 may take any of several shapes, so long as it has an average bottom diameter of 30 feet or less and so long as it is at least nine to twelve feet deep. Another embodiment of cell 24 is shown in FIG. 3. In this embodiment, the cell has rigid sidewalls 50 which are joined by an end wall 61. Sidewalls 50 are shown as cylindrical and fabricated of concrete, but can be any material which will withstand attack by the surrounding substrate or wastewater, and which has sufficient strength and rigidity to retain its shape. Because there is no danger of sidewall collapse, the sidewalls are vertical, which saves area and which may enhance the efficiency of the treatment process. In another embodiment, and wall 61 is omitted.

FIG. 3 also shows this anaerobic/aerobic treatment process in more detail. The aerator 48 preferably is supported off of bottom 51 by a predetermined distance, such as one to two feet, by means such as feet 62; any other rigid support will serve. When air is injected through pipe 46 to a location beneath or in the bottom of aerator 48, it will rise, being broken up into a pattern of bubbles by aerator 48. As the bubbles 63 rise, they will gradually be absorbed into the water around them, and will be smaller or even nonexistent by the time they reach the top of pond 20.

The bubbles 63 also act to entrain streams 67 of wastewater upward, disinfecting it as it goes. Another reason for new, less-treated wastewater moving upward is because it is warmer than the water into which it is injected; the wastewater will tend to be roughly similar in temperature to the interior of residence 12. Further, by having been compressed by blower 44, the air in bubbles 63 is warm, such as 100° F., and this makes a further contribution to the wastewater temperature. These causes combine to create upward, central wastewater flows 67 as shown.

But as the flows 67 rise, other factors begin to be felt. The temperature of flows 67 decreases as they rise, and the temperature of flows 67 becomes closer to surrounding water. Further, less-treated wastewater will tend to be denser than more-treated wastewater. Finally, the upwardly urging force of bubbles 63 diminishes as they are gradually absorbed into surrounding liquid.

Therefore, as the flows 67 near the elevation 26, they will cease all upward displacement, will be displaced laterally by upwardly moving water behind them, and will begin to sink along the outer margins of cell 24. A diameter of thirty feet is a maximum size for cell 24 because this is the largest size at which the desired illustrated flows have been detected for a single air injection source.

The anaerobic zone 57 acts as a mesophilic digester. The organic matter in the wastewater breaks down into methane ($CH_4$), carbon dioxide ($CO_2$), hydrogen sulfide ($H_2S$), phosphate ($PO_4^{3-}$), potassium ($K^+$), combined nitrogen in the forms of nitrate ($NO_3$), nitrite ($NO_2$), ammonia ($NH_3$) and nitrogen gas ($N_2$), and water. Aeration converts $H_2S$ to $SO_4^{2-}$(sulfate) and eliminates any odor. Because the organic solids are converted to soluble gases and ions, sludge production is essentially eliminated. Much of the nitrogen, phosphorus and potassium will remain in the wastewater and may be used beneficially as plant nutrients.

The anaerobic zone 57 should be maintained at a temperature of at least 41° F. to maintain proper digestion action. This minimum temperature will be maintained even in the most extreme environments because (1) newly injected wastewater is typically warm, (2) the aeration air is hotter than ambient because of compression and (3) the water in cell 24 is insulated by the earth around it and the storage volume 28 above it.

Because of the difference in specific gravity, only the cleanest, most particulate-free and most aerated water is displaced out of cell 24 by new wastewater introduced through conduit 18. Cell 24 is, in essence, a wastewater trap from which only cleaned, reclaimed water escapes.

As compared to septic tanks and municipal sewage treatment, the invention has another benefit. Solids which do not biodegrade over the short term, but which do so over the long term, will eventually be converted in cell 24. Only the most inert materials will accumulate on bottom 51, at rates that are orders of magnitude less than conventional sludge accumulation rates.

Returning to FIGS. 1 and 2, the sizing of pond 20 (calculated as the sum of treatment cell 24 and storage volume 28) will vary according to the maximum number of days in any given year during which reclaimed water may not be discharged. In a temperate climate such as Illinois, this is a period during the winter months between sustained thaws. In one embodiment, the storage volume 28 has been sized to contain 120 days of treated wastewater effluent, or at least 42,000 gallons, for a total storage capacity in the pond 20 of 156 days.

In semitropical and tropical climates, storage volume 28 may be very small, as there will be no temperature-related reason not to discharge reclaimed water. The size of storage volume 28 will instead be influenced by such things as maximum permissible nutrient loading of irrigated area 36 and the cessation of discharge because of flooding or slow percolation. Storage volume 28 may, in some instances, be 1w or less.

In one exemplary embodiment, storage volume 28 is about two and one-half feet deep at its greatest extent (excluding the depth of the treatment volume) and its largest shore-to-shore diameter is 50 feet. It is preferred that the upper limit of storage volume 28 be at least two feet above elevation 26.

As is shown in FIG. 2, the aesthetics of storage volume 28 may be improved, and habitat for wildlife increased, by providing wetland vegetation 72 around the periphery of storage volume 28. This also disguises the rise and fall of the level of pond 20, as wastewater is injected into the pond 20 or as reclaimed waster is withdrawn.

Where possible, the storage volume 28 should be sloped inward from its periphery 52 at a slope of about 4:1 (run:rise). The shape and lateral boundary of the storage volume 28 can be dictated by the site and by aesthetics, so long as it at least adjoins, and preferably overlies, treatment volume 24. It is even possible to create a cylindrical storage volume over cell 24 and nowhere else, the result being a very deep vessel, the bottom of which is occupied by treatment cell 24.

The periphery of pond 20 should include a freeboard area of about two feet in elevation above storage volume 28.

Figure 4:
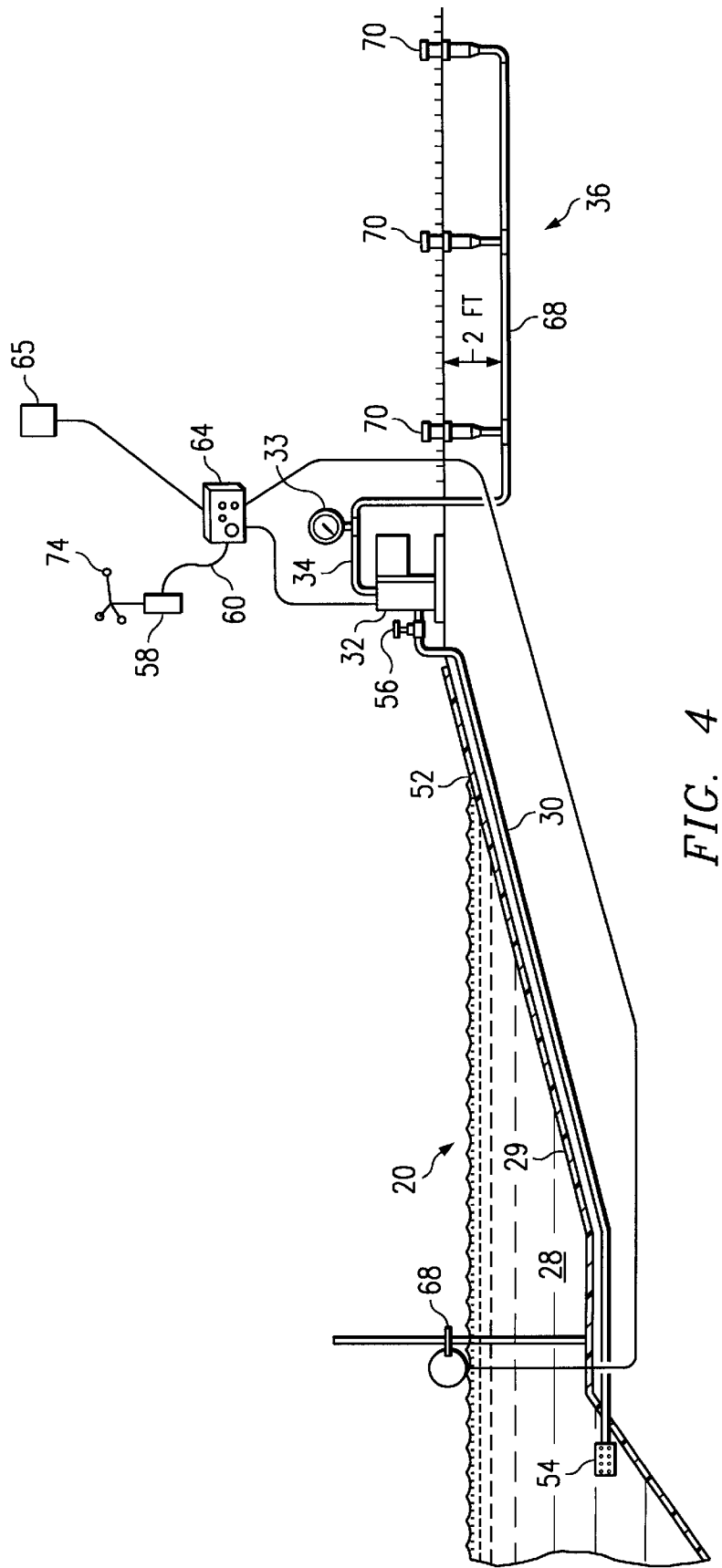
FIG. 4 is a diagrammatic detail view showing components of a wastewater reuse subsystem according to the invention.

After reclamation, the water will be virtually pathogen-free, to below levels for potability, and will have dissolved therein combined nitrogen, potassium and phosphates. The reclaimed water is therefore suitable for reuse. The details of one such treated wastewater reuse system are shown in FIG. 4. A grate or filter is fitted to an inlet end of the reclaimed water withdrawal pipe 30. The withdrawal pipe 30, which is the illustrated embodiment should be at least ¾" to 2" in inner diameter, is routed underneath the liner 29 of the storage volume 28 from a point preferably, but not necessarily, remote from the treatment cell 24. The withdrawal pipe or conduit 30 terminates at its other end with a gate valve 56, which is selectively operated to open or close the inlet to irrigation pump 32. When gate valve 56 is open, the irrigation pump 32 may be selectively operated to draw reclaimed water from the storage volume 28 as a predetermined function of any of several environmental conditions or combinations thereof. In the illustrated embodiment, the pump 32 is an 0.75 horsepower pump and has a pumping rate of 12.5 gpm.

One beneficial use of the reclaimed water is the combined irrigation and fertilization of plants, which may be of several varieties. One such is cropland, another is forested area, a third is the grass of golf courses, and a fourth is an area of a residential yard or garden. Where irrigation is the beneficial use, environmental conditions will have a role to play in the selective release of the wastewater. As explained above, there will be no release during subfreezing temperatures. The release of reclaimed water can also be a function of wind velocity and recent precipitation. During periods when the environmental conditions are suitable for release, the release rate may be about two inches per week, equivalent to twenty applications of one-tenth of an inch per hour. A single application will take twelve minutes; therefore, on the average, irrigation will occur four hours per week.

It is preferred to irrigate primarily at night. Release is more desirable under less windy conditions, such as under wind speeds of less than about 22 miles per hour, in order to prevent accelerated evaporation, and is more desirable in the absence of precipitation to remedy any shortfall in watering needs of the plants. A water meter 33 is installed on irrigation pipe to determine actual irrigation rates. The irrigation is conducted such that it will not exceed maximum hourly, daily and weekly loading. For example, a maximum loading per hour can be set at 0.25 inches (measured as a rainfall equivalent); a maximum loading per day, 1.00 inches; and a maximum loading per week, 3.00 inches. A signal from the water meter 33 can be sent to an irrigation pump controller 64, where the amount of irrigation per hour, day and week are kept in appropriate memory registers (not shown).

The type of soil in the irrigation area will also affect maximum permissible loading. For a soil of moderate permeability, the allowable loading rate is about 0.62 gallons/square foot/day or about 9.8 million gallons per acre per year. For actual installations, the experienced loading is expected to be one-fifth this.

Regulatory conditions also determine when the wastewater is released; while the treatment system of the invention yields reclaimed water which has bacterial counts below the limits required for potable water, public authorities may nonetheless demand that the reclaimed water be released under conditions which will militate against its dispersal. These governmental authorities may mandate that the reclaimed water be released under nonwindy conditions and under nonflooded or non-spongy-wet conditions.

The wind may be sensed by an anemometer 58, which produces a pulse train on communications line 60 as a function of the number of revolutions of its cups 74. The line 60 is, in the illustrated embodiment, connected to the programmable electronic timer or controller 64. Controller 64 may delay an "on" cycle, by sensing from anemometer 58 that the wind is above a predetermined speed, such as 22 mph, taken either as an instantaneous or averaged value. An electronic rain gauge 65 may be provided which can send a further data signal to the controller 64, which in response will control pump 32 such that no reclaimed water withdrawal will be made under wet conditions; this in turn ensures that there will be no reclaimed water runoff to locations off of the property and that water will be applied to the plants when they most need it. The timer/controller 64 in turn has control path 66 connected to the pump 32, where it activates a relay (not shown) to energize the pump 32.

Another condition monitored by the controller 64 is storage volume water level, as by sensing a signal from a pond water level meter 68. If the water level sensed by meter 68 drops below a predetermined level, as might happen if building 12 is temporarily unoccupied, withdrawal will be prevented.

During subfreezing weather, the gate valve 56 is closed, the pump 32 is cycled to remove excess water from the pipe 34 and the sprinklers (described below) attached to it, and the pump 32 is covered.

Irrigation pipe or main 34, which in the illustrated embodiment should be 2 inches inner diameter, terminates in an underground irrigation pipe network 68, to which are connected, at appropriate intervals, pop-up sprinlders 70 according to standard residential lawn sprinkling practice. The irrigation pipe network, which can be made up of lengths of 0.75 inch PVC pipe, is buried at least two feet below the surface and is drained prior to the winter season to prevent freezing. Preferably, the pop-up sprinklers are so sited, oriented and configured that mist does not stray onto adjacent property. For larger irrigated areas, zoned sprinkling may be provided and would be controlled by controller 64.

In alternative embodiments the above-described reclaimed water withdrawal apparatus may be simplified by replacing any or all of the above inputs and algorithms with a user-operated manual control. A manual override is preferred in any case.

One of the nutrients provided to the irrigated plants is nitrogen. In the illustrated embodiment, a year's flow will provide about 19.2 pounds of nitrogen in all forms, used to irrigate and fertilize about 3,000 square feet of landscaping and garden area. The combined N-P-K loading, at about 10-10-10 concentrations, is about 32 pounds per year; depending on the size of the irrigated area, applied fertilizer will reduce or eliminate the need to apply commercial fertilizer. After denitrification losses (loss of nitrogen as $N_2$ to the atmosphere), the annual application of nitrogen should be about 0.1 ounce per square foot; it is expected that the plants will take up essentially all of this, leaving none to migrate off-site. The closed nature of the system of the invention permits no more than 10 mg/l in combined nitrate, nitrite and ammonia at the monitoring wells.

The minimum size of the irrigation area 36 is primarily determined by the loading requirements imposed by the flow from wastewater source 12. Assuming a discharge rate of 350 gpd, the annual wastewater discharge is 365 times this, or 127,750 gallons per year. Average weekly discharge through a 35-week irrigation season is 3,650 gallons/week. There are 27,154 gallons in an acre inch; 3,650 gallons per day, divided by 27,154 gallons in an acre inch, yields 0.134 acre inch per week on the average. Assuming an average irrigation rate of two inches per week, this results in a minimum irrigated area size of 0.067 acre, or about 2,919 square feet.

The reclaimed water is essentially used twice. To the extent that it is used as a substitute for other sprinkling or irrigation, and assuming a potable water cost of $0.25 per 1,000 gallons, the second, beneficial use of the reclaimed water saves the property owner about $32 per year in water bills. Other avoided costs are sewer connection fees (where connection to a municipal sewage system is even a possibility), commercial fertilizer costs, as above outlined, and sludge removal fees.

The inventor contemplates many variations of the above-described environment. For example, certain sites may not need pump 32 to remove treated wastewater; if the pond 20 is elevated above the irrigation area, treated wastewater may be selectively released by a sluice gate or the like. In another embodiment, the irrigated area could be at a considerable remove from the pond 20. To meet regulatory requirements the reclaimed water may be chemically treated prior to release.

In summary, a wastewater treatment and reuse system has been shown and described which is ideally suited for single residential and small commercial use, which results in the beneficial reuse of wastewater used to remove and treat biodegradable waste, and which obviates the growing problem of sludge removal. While a preferred embodiment has been described in the above detailed description and illustrated in the drawings, the invention is not limited thereto but only by the scope and spirit of the appended claims.

What we claim is:

1. A small-flow wastewater reclamation and reuse system for flows of less than 1,500 gallons per day, comprising:

a wastewater source having a flow w of less than 1,500 gallons per day;

a pond having a wastewater treatment cell with a volume in the range of about 14w to about 42w, the wastewater treatment cell being disposed between a first elevation and a second elevation higher than the first elevation;

a storage volume in the pond adjoining the treatment cell and having at least a portion disposed between the second elevation and a third elevation higher than the second elevation, a sum of the volume of the treatment cell and the storage volume being greater than or equal to the longest number of days during which discharge of reclaimed, stored water cannot be made during the year, times w;

means for delivering air to an air conduit at a rate which is at least 1500 STP cubic feet per pound of $BOD_5$ introduced into the treatment cell, an end of the air conduit disposed in the treatment cell at a fourth elevation above the first elevation and substantially below the second elevation;

means adapted to receive the flow w from the wastewater source and to introduce the flow w into the treatment cell;

an outlet adjacent the pond adaptable to remove stored reclaimed water from the storage volume; and means coupled to the outlet for the stored, reclaimed water to a beneficial use.

2. The system of claim 1, wherein the means for delivering air heats and compresses the air, the heated air injected into the treatment cell contributing to maintaining the wastewater therein at a temperature of at least 41 degrees Fahrenheit.

3. The system of claim 1, wherein the wastewater treatment cell has a volume of about 36w.

4. The system of claim 1, wherein the volume of the storage volume is in the range of 1w to 136w.

5. The system of claim 4, wherein the volume of the storage volume is about 120w.

6. The system of claim 1, wherein a lateral extent of the storage volume greatly exceeds a lateral extent of the treatment cell.

7. The system of claim 1, wherein the treatment cell is approximately cylindrical or frustoconical.

8. The system of claim 1, wherein a difference between said first and second elevations is in the range of nine to twelve feet.

9. The system of claim 1, wherein a difference between the first and fourth elevations is in the range of one to two feet.

10. The system of claim 1, wherein the beneficial use is the irrigation of a predetermined area, the means for applying the treated, stored reclaimed water comprising a conduit from the outlet to the area and means for urging the reclaimed, stored water from the storage volume to the predetermined area.

11. The system of claim 10, wherein the means for urging comprises a pump.

12. The system of claim 1, and further including a macerator disposed between the source of wastewater and the treatment volume for macerating biodegradable mass in the wastewater.

13. The system of claim 1, wherein the longest number of days during the year during which treated, stored wastewater may not be discharged is calculated as the average longest period of freezing weather at the location at which the system is to be installed.

14. A single-cell wastewater reclamation and reuse system, comprising:

a wastewater source having an average daily flow w;

a pond having a single wastewater treatment cell with a volume in the range of 14w to about 42w, the cell disposed between a first elevation and a second elevation higher than the first elevation;

means for delivering air to the treatment cell at a rate of at least 1500 cubic feet per pound of $BOD_5$ in the wastewater introduced into the treatment cell, the means including an air conduit with an end disposed in the treatment cell at a third elevation higher than the first elevation and substantially lower than the second elevation;

means for receiving the flow w from the wastewater source and delivering the flow w to the treatment cell at a point between the first and third elevations;

a reclaimed water storage volume formed to adjoin and be in fluid communication with the treatment cell, at least a portion of the reclaimed water storage volume disposed between the second elevation and a fourth elevation higher than the second elevation;

an outlet adjacent the storage volume adaptable to remove stored, reclaimed water from the storage volume; and means coupled to the outlet for applying the stored, reclaimed water to a beneficial use.

15. The system of claim 14, wherein the cell has a volume of about 36w.

16. The system of claim 14, wherein the means for delivering air is a blower which, as a byproduct of comprising the air, heats the air, the heated air contributing to the maintenance of at least a portion of the treatment cell at or above a temperature of 41 degrees Fahrenheit.

17. The system of claim 14, wherein the volume of the storage volume is in the range of 1w to 136w.

18. The system of claim 17, wherein the volume of the storage volume is about 120w.

19. The system of claim 14, and further comprising an aerator coupled to the end of the air conduit.

20. The system of claim 14, wherein a lateral extent of the storage volume greatly exceeds a lateral extent of the treatment cell.

21. The system of claim 14, wherein the treatment cell is approximately cylindrical or frustoconical.

22. The system of claim 14, wherein the difference between the second and third elevations is in the range of eight to ten feet.

23. A wastewater reclamation and reuse system, comprising:

a wastewater source;

a pond having at least one wastewater treatment cell, the cell disposed between a first elevation and a second elevation;

means for receiving an average daily wastewater flow w from the wastewater source and for introducing the flow w into the treatment cell at a location near the first elevation;

the cell having a bottom at the first elevation, a diameter of the bottom not exceeding thirty feet, sidewalls for the cell extending from the bottom to the second elevation, a volume of the cell being in the range of about 14w to about 42w;

means for delivering air to an air conduit at a rate of at least 1500 STP cubic feet per pound of $BOD_5$ introduced into the treatment cell by the wastewater, an end of the air conduit disposed in the treatment cell at a third elevation higher than the first elevation but substantially below the second elevation;

a storage volume of the pond adjoining the treatment cell and having at least a portion disposed between the second elevation and a fourth elevation higher than the second elevation, a sum of the volume of the treatment cell and the storage volume being greater than or equal to the longest number of days during which discharge of reclaimed, stored water cannot be made during the year, times w;

an outlet adjacent the storage volume adaptable to remove stored, reclaimed water from the storage volume; and means coupled to the outlet for applying the stored, reclaimed water to a beneficial use.

24. The system of claim 23, wherein the sidewalls of the treatment cell are sloped outwardly from the treatment cell bottom.

25. The system of claim 24, wherein the slope of the sidewalls of the treatment cell are sloped outwardly from the treatment cell bottom at a slope of about one foot of rise to 0.5 foot of run.

26. The system of claim 23, wherein the diameter of the bottom of the treatment cell is in the range of about twelve to about seventeen feet.

27. The system of claim 26, wherein the diameter of the bottom of the treatment cell is about fifteen feet.

28. The system of claim 23, wherein a bottom of the storage volume and the sidewalls of the treatment cell form a shoulder at the second elevation.

29. The system of claim 23, wherein the treatment cell is approximately frustoconical.

30. The system of claim 23, wherein the treatment cell is approximately cylindrical.

31. The system of claim 23, wherein the storage volume has an area, measured at the fourth elevation, which greatly exceeds an area of the treatment cell taken at the second elevation, said storage volume area including all of a vertical projection of said treatment cell area.

32. The system of claim 31, wherein the storage volume has an outer margin, the bottom of the storage volume at the outer margin being sloped, wetland vegetation planted in a zone including the outer margin to obscure the rise and fall of the water level in the storage volume.

33. A method for treating and reusing wastewater from a wastewater source having a predicted wastewater flow per day of w which is less than 1,500 gallons, comprising the steps of:

receiving the wastewater flow into an anaerobic zone of a treatment cell in a pond, the treatment cell being disposed below a first elevation and having a size in the range of about 14w to about 42w;

digesting the organic matter in the wastewater in the anaerobic zone into gases, and inorganic solutes;

aerating the wastewater in an aerobic zone of the treatment cell adjacent the anaerobic zone with a volume of air which is at least 1500 STP cubic feet for every pound of $BOD_5$ in the wastewater flow;

in response to said step of aerating, killing substantially all pathogens in the wastewater, thereby transforming the wastewater into reclaimed water;

in response to said step of aerating, converting a hydrogen sulfide product of said step of digesting into sulfate;

responsive to receiving further wastewater flow into the treatment cell, displacing reclaimed water from the treatment cell in the pond to an adjoining storage volume in the pond, the storage volume disposed above the first elevation;

disposing an inlet end of a discharge conduit in the storage volume;

selectively removing reclaimed water from the storage volume through the discharge conduit; and using the removed reclaimed water for a beneficial use.

38. The method of claim 33, wherein said step of using the removed reclaimed water for beneficial use comprises the step of using the removed water for irrigation.

35. The method of claim 34, and further comprising the step of using a programmable controller to selectively operate a means for selectively removing the stored, reclaimed water, the programmable controller operating said means as a function of a plurality of environmental variables.

36. The method of claim 35, wherein the environmental variables are selected from the group consisting of wind speed, amount of rain received on an irrigation site within a predetermined past period, amount of irrigation loading on the irrigation site that has already occurred during a predetermined past period, time of day, current temperature, temperature over a predetermined past period, amount of treated wastewater available for irrigation, and whether the site is flooded.

37. A method for constructing a small-flow wastewater reclamation and reuse system, comprising the steps of:

estimating an average daily discharge rate from a wastewater source to be w gallons per day, where w is less than or equal to 1,500;

providing a treatment cell having a volume of between about 14w and about 42w as a portion of a pond, the treatment cell disposed below a predetermined elevation;

providing a storage volume in the pond to adjoin the treatment cell and to be disposed above the predetermined elevation, a sum of the volume of the treatment cell and the storage volume having a capacity of at least dw, where d is the average number of consecutive days at the pond location during the year during which reclaimed water may not be discharged;

connecting the wastewater source to the treatment cell with a first conduit;

installing an end of an air conduit in the treatment cell at an elevation substantially lower than the predetermined elevation, the air conduit capable of introducing a volume of air into the treatment cell it which is at least 1500m STP cubic feet per day, where m is the estimated average number of pounds of $BOD_5$ carried by wastewater flow w;

providing a means for forcing the volume of air into the air conduit;

installing a first end of a reclaimed water withdrawal conduit within the storage volume; and providing a means to selectively withdraw reclaimed water from the storage volume through the reclaimed water withdrawal conduit to a location for the beneficial use of the reclaimed water.

38. The method of claim 37, and further including the step of providing a programmable controller for controlling the means to selectively withdraw reclaimed water, the programmable controller being responsive to a programmably predetermined combination of a plurality of environmental factors in determining the timing and extent of withdrawing the reclaimed water.

39. A method of converting a septic system designed to accept wastewater flows of less than 1,500 gallons per day to a wastewater reclamation and reuse system, comprising the steps of:

providing a combined wastewater treatment and storage pond at a site incorporating the septic system, as a portion of the pond, providing a treatment cell having a volume of about 14w to about 42w, where w is the calculated average daily discharge volume of a habitation for which the septic system was provided, and w is less than or equal to 1,500 gallons, the treatment cell being disposed between a first elevation and a second elevation higher than the first elevation;

as a portion of the pond, providing a reclaimed water storage volume which has at least a portion adjoining the treatment cell and disposed above the second elevation, a sum of the volume of the treatment cell and the storage volume being greater than or equal to dw, where d is the average number of consecutive days at the pond location during the year during which reclaimed water may not be withdrawn;

tapping into a preexisting sanitary sewer running from the habitation to a preexisting septic tank with an additional wastewater introduction conduit portion to make a complete wastewater introduction conduit;

closing off the connection of the sewer pipe to the septic tank;

routing the additional wastewater introduction conduit portion from the location where it is tapped into the sewer pipe to a location near the bottom of the treatment cell;

installing a wastewater pump in the complete wastewater introduction conduit;

installing an end of an air conduit in the treatment cell at a third elevation higher than the first elevation but substantially lower than the second elevation;

connecting the air conduit to a blower, the blower capable of introducing a volume of air of at least 1500 cubic feet (STP) per pound of biomass entrained in the wastewater sent to the treatment cell;

routing a reclaimed water withdrawal conduit from a location in the storage volume to a withdrawal pump; and installing a beneficial use conduit from the withdrawal pump to a location where reclaimed water may be beneficially used.

40. The method of claim 39, wherein the third elevation is about one to two feet above the first elevation and about eight to twelve feet below the second elevation.

41. A method for constructing a wastewater reclamation and reuse system for a wastewater source having an estimated average daily discharge rate of w, comprising the steps of:

providing a single treatment cell having a volume in the range of 14w to 42w as a portion of a pond, the treatment cell disposed below a predetermined elevation;

providing storage volume in the pond to adjoin the treatment cell and to be disposed above the predetermined elevation, a sum of the volume for the treatment cell and the storage volume having a capacity of at least dw, where d is the average number of consecutive days at the pond location during the year during which reclaimed water may not be discharged;

connecting the wastewater source to the treatment cell with a first conduit;

installing an end of an air conduit in the treatment cell at an elevation substantially lower than the predetermined elevation, the air conduit capable of introducing a volume of air into the treatment cell which is at least 1500m cubic feet (STP) per day, where m is the estimated average number of pounds of $BOD_5$ in the flow w;

providing a means for forcing the volume of air into the air conduit;

installing an end of a reclaimed water withdrawal conduit within the storage volume; and providing a means for selectively withdrawing reclaimed water from the storage volume through the reclaimed water withdrawal conduit to a location for the beneficial use of the reclaimed water.

42. The method of claim 41, wherein the elevation of the air conduit is about eight to twelve feet below the predetermined elevation.

43. The method of claim 39, and further comprising the step of providing an aerator in the treatment cell at the end of the air conduit to distribute air injected by the conduit.

44. A method for constructing a wastewater reclamation and reuse system for a wastewater source having an estimated average daily discharge rate of w, comprising the steps of:

providing a wastewater treatment pond having a reclaimed water storage volume such that a capacity of the storage volume and a wastewater treatment cell is at least dw, wherein d is the average number of consecutive days at the pond location during the year during which reclaimed water may not be discharged, a bottom of the storage volume having a portion at a first elevation;

excavating a wastewater treatment cell from said bottom portion of the storage volume to a second elevation which is at least nine feet lower than the first elevation, and such that the treatment cell has a volume in the range of 14w to 42w, and such that a bottom of the treatment cell has an average diameter which does not exceed thirty feet;

connecting the wastewater source to the treatment cell with a first conduit;

installing an end of air conduit in the treatment cell at a third elevation higher than the second elevation and substantially lower than the first elevation;

connecting an air source to the air conduit capable of injecting a volume of air which is at least 1500 cubic feet (STP) per pound of $BOD_5$ introduced into the treatment cell by the first conduit;

installing an end of a reclaimed water withdrawal conduit in the storage volume; and providing a means to withdraw reclaimed water through the withdrawal conduit and apply the reclaimed water to a beneficial use.

* * * * *